United States Patent [19]
Forkner et al.

[11] Patent Number: 5,467,207
[45] Date of Patent: Nov. 14, 1995

[54] LCD PROJECTION SYSTEM WHICH ALIGNS THE LARGER BEAM SPREAD ANGLE OF THE LIGHT SOURCE WITH THE LARGER ACCEPTANCE ANGLE OF THE LIGHT VALVE AND A NONIMAGING REFLECTOR FOR AN ILLUMINATION SYSTEM

[75] Inventors: John F. Forkner, South Laguna, Calif.; Ronald F. Rykowski, Woodinville, Wash.; Stephen S. Wilson, Lake Elsinore, Calif.

[73] Assignee: Prolux Corporation, San Juan Capistrano, Calif.

[21] Appl. No.: 271,368

[22] Filed: Jul. 6, 1994

[51] Int. Cl.⁶ .................. G02F 1/1335; G03B 21/00; G03B 21/14
[52] U.S. Cl. .................. 359/40; 359/48; 359/49; 353/31; 353/38
[58] Field of Search ............ 353/98, 102, 122, 353/31, 38, 33, 34, 37; 359/40, 48, 49, 41

[56] References Cited

U.S. PATENT DOCUMENTS

| | | | |
|---|---|---|---|
| 1,275,120 | 8/1918 | Ballman et al. | 353/98 |
| 3,689,760 | 9/1972 | Stewart, Jr. | 353/98 |
| 4,009,394 | 2/1977 | Mierzwinski | 250/552 |
| 4,701,027 | 10/1987 | Harrigan et al. | 359/40 |
| 4,770,525 | 9/1988 | Umeda et al. | 353/38 |
| 4,832,461 | 5/1989 | Yamagishi et al. | 353/122 |
| 4,912,614 | 3/1990 | Goldenberg | 362/347 |
| 4,917,465 | 4/1990 | Conner et al. | 359/41 |
| 4,936,657 | 6/1990 | Tejima et al. | 359/40 |
| 4,976,536 | 12/1990 | Vogeley et al. | 353/77 |
| 5,146,248 | 9/1992 | Duwaer et al. | 353/122 |
| 5,355,187 | 10/1994 | Ogino et al. | 353/38 |

OTHER PUBLICATIONS

"Characterizations of Viewing–Angle–Dependent Colorimertric and Photometric Performance of Color LCDs", *SID 93 Digest*, T. G. Fiske et al., 1993, pp. 565–568.

"A High–Light–Output Active–Matrix TN–LC Projector for Video and Data–Graphics Applications", SID 93 Digest. P. Candry et al., pp. 291–294.

"A Compact LCD Rear Projector Using a New Bent–Lens Optical System", *SID 93 Digest*, S. Shikama et al., 1993, pp. 295–298.

*Primary Examiner*—William L. Sikes
*Assistant Examiner*—Walter J. Malinowski
*Attorney, Agent, or Firm*—Donald E. Stout

[57] ABSTRACT

A projection system comprising a liquid crystal light valve having a wider acceptance angle for incident light in a first direction than in a second direction transverse to the first direction and an illumination system. The illumination system provides light to the liquid crystal light valve at a greater beam spread angle in the first direction than in the second direction. The system also includes projection optics for receiving light from the liquid crystal light valve and projecting such light toward a projection surface.

34 Claims, 4 Drawing Sheets

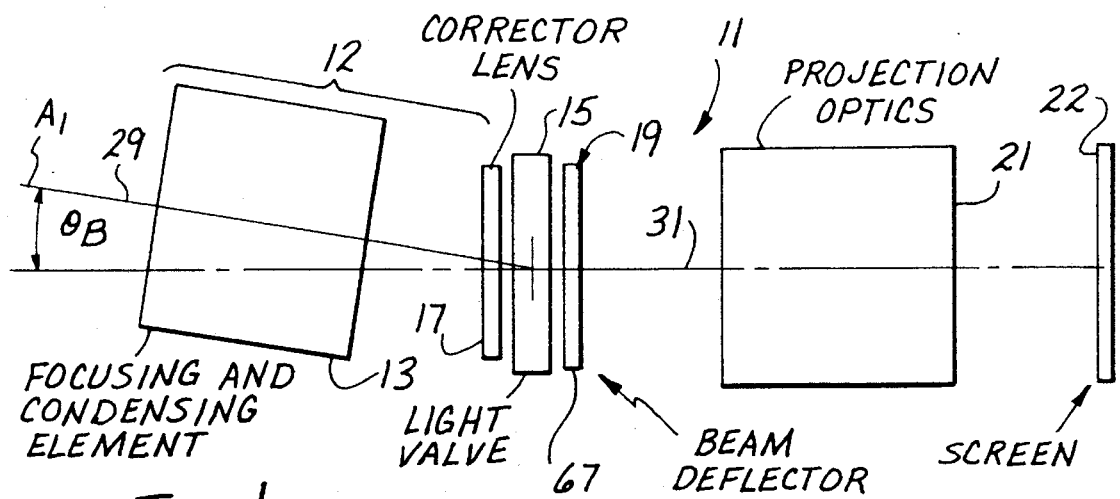
Fig. 1
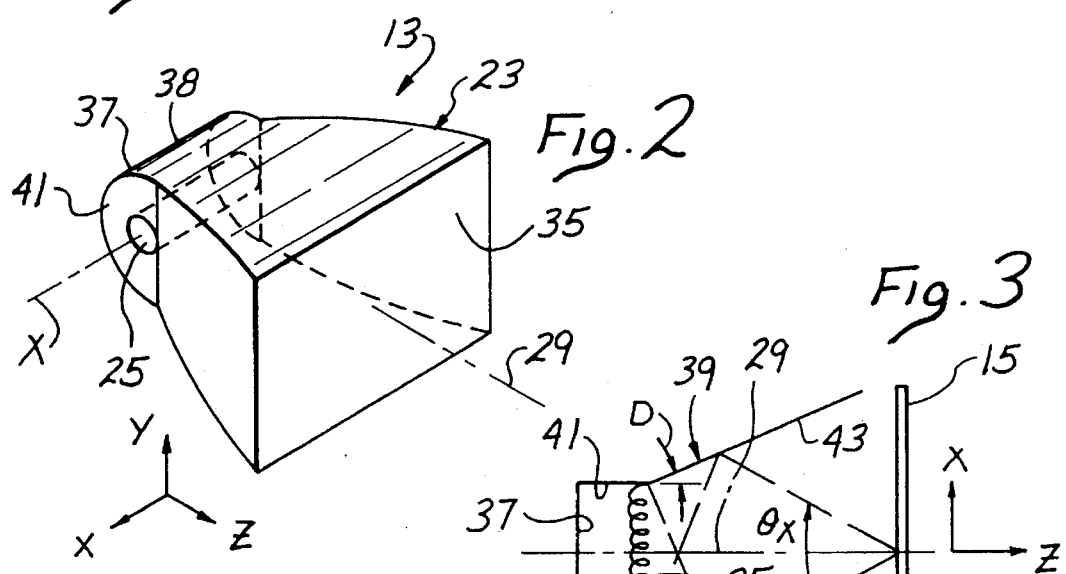
Fig. 2
Fig. 3
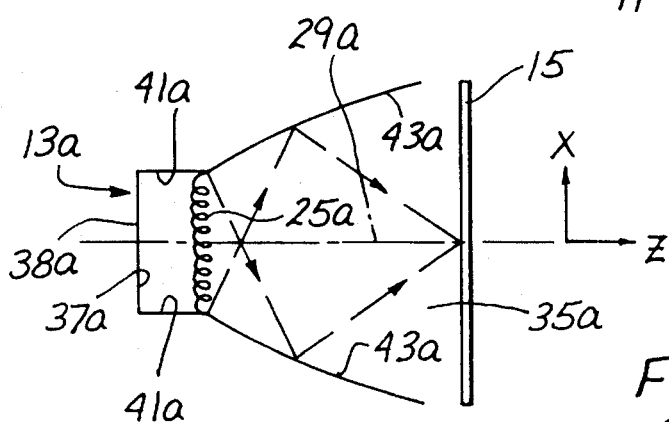
Fig. 3A

LCD PROJECTION SYSTEM WHICH ALIGNS THE LARGER BEAM SPREAD ANGLE OF THE LIGHT SOURCE WITH THE LARGER ACCEPTANCE ANGLE OF THE LIGHT VALVE AND A NONIMAGING REFLECTOR FOR AN ILLUMINATION SYSTEM

BACKGROUND OF THE INVENTION

Projection systems utilizing a liquid crystal light valve are usable in a variety of applications such as computers, video projectors and television. A projection system of this type may include a liquid crystal light valve, an illumination system for providing light to the light valve and projection optics for receiving light from the liquid crystal light valve and projecting such light toward a projection surface, such as a screen.

An important component of this system is the liquid crystal light valve which modulates the light in accordance with applied electrical signals to provide the desired image for projection onto the screen. The liquid crystal light valve may include a nematic liquid crystal cell and light polarizers. The crystals are oriented so that the light valve blocks incident light when no voltage is applied to the light polarizers, and the crystals are reoriented when a proper signal is applied so that the light valve transmits light. It is desirable for a liquid crystal light valve to have high contrast on the order of 100 to 1 where contrast is defined as the ratio of the intensity of light transmitted with the light valve turned on to the intensity of light transmitted with the light valve turned off.

A well known characteristic of liquid crystal light valves is that their ability to transmit or block light varies with the angle of incidence of the light on the valve. The angular dependence of the transmission of light through the light valve is such that there is a wide acceptance angle providing high contrast in a first direction and a narrower acceptance angle providing high contrast in a second direction which is perpendicular to the first direction. This characteristic of liquid crystal light valves is discussed, for example, in *Characterizations of Viewing-Angle-Dependent Colorimetric and Photometric Performance of Color LCDS* by T. G. Fiske and L. D. Silverstein, SID 93 Digest, pages 565–568 and in Tejima et al U.S. Pat. No. 4,936,657. For convenience, the first direction is hereinafter sometimes referred to as the X direction and the second direction is sometimes referred to as the Y direction. In a spatial coordinate system having X, Y and Z axes, the X and Y directions are commonly thought of being horizontal and vertical, respectively. However, because the light valve can be oriented in various different ways, unless expressly stated, the X and Y directions as used herein do not necessarily mean horizontal and vertical directions, respectively.

The X and Y directions can be defined with respect to certain components of the liquid crystal light valve. Thus, the liquid crystal light valve produces maximum contrast when the direction of the incident illumination coincides with the long axis of the liquid crystal molecules. When maximum signal voltage is applied to electrode plates of the light valve, the long axes of the liquid crystal molecules tilt nearly 90° upward from the plane of the electrode. The Y direction lies in a plane which is normal to the plane of the electrodes and which contains the long axes of the liquid crystal molecules when the maximum voltage is applied. The X direction is perpendicular to the Y direction.

The prior art has recognized the importance of the small acceptance angle in the Y direction and this is shown, for example, by Goldenberg U.S. Pat. No. 4,912,614 and Duwaer U.S. Pat. No. 5,146,248. These patents seek to provide light to the liquid crystal light valve which has only a small deviation or beam spread angle with respect to collimated rays in both the X and Y directions. Simply stated, the attempt is to provide light to the liquid crystal light valve which is nearly collimated in both the X and Y directions. The provision of nearly collimated light in the Y direction provides a small deviation or beam spread angle in the Y direction and is effective to provide high contrast. However, this system does not provide as much total light to the liquid crystal light valve for a given source luminous intensity as is desired. More specifically, this system is very inefficient by not permitting additional light to be transmitted through the light valve in the X direction.

Another characteristic of a liquid crystal light valve is that the acceptance angle in the Y direction has a fixed angular bias which may be, for example, 5 to 20 degrees. This is discussed, for example, in *A High-Light-Output Active-Matrix TN-LC Projector for Video and Data-Graphics Applications* by P. Candry et al, SID 93 Digest pages 291–94 and Tejima et al U.S. Pat. No. 4,936,657. If the incident light falls outside the optimum acceptance angle in the Y direction as offset by the bias angle, then light leaks through the liquid crystal light valve in the off state and the contrast ratio is reduced.

To obtain high contrast, the bias angle must be taken into account and this results in the transmission of light through the liquid crystal display valve substantially at the bias angle. It is desirable to deflect the light transmitted by the liquid crystal display through a deflection angle toward the projection optics to at least partially correct for the bias angle. Tejima et al U.S. Pat. No. 4,936,657 teaches the use of a Fresnel lens to accomplish this beam deflection. A Fresnel lens has a series of discrete steps in one or both of its surfaces, and one disadvantage of this construction is that for certain applications these steps may be imaged by the projection optics.

SUMMARY OF THE INVENTION

This invention generally overcomes the problems discussed above and provides other important advantages. With this invention, more light is provided to the liquid crystal light valve while maintaining the desired high contrast ratio and achieving essentially uniform light intensity distribution at the light valve. In addition, beam deflection of the light passing through the liquid crystal light valve at the bias angle is deflected toward the projection optics without the accompanying danger of imaging the steps or discontinuities of a Fresnel lens.

A projection apparatus constructed in accordance with this invention may include a liquid crystal light valve having a first acceptance angle in a first direction and a second acceptance angle in a second direction or plane transverse to the first direction. The first acceptance angle is larger than the second acceptance angle.

An illumination system provides light to each of a plurality of pixels of a region of the liquid crystal light valve at a first deviation or beam spread angle in the first direction and a second deviation or beam spread angle in the second direction or plane with the first beam spread angle being larger than the second deviation angle at each of the pixels of the region. Preferably such region of the liquid crystal light valve covers substantially the entire active area of the light valve. The deviation or beam spread angle may be considered as a measure of the degree to which light is collimated or decollimated or the degree to which light rays deviate from collimated rays with the smaller beam spread angle representing light that is more nearly collimated. However a more precise definition is given below. The liquid crystal light valve modulates the light provided to it by the illumination system and projection optics receive the light from the liquid crystal light valve and project such light toward a projection surface such as a screen.

It is important to note that this invention orients the larger beam spread angle and the larger acceptance angle so that they are in the same direction or plane and this direction will typically, although not necessarily be horizontal. This enables the wide acceptance angle in that direction to be used to receive light throughout a relatively large beam spread angle in that direction with the result that more light from the source is accepted by the light valve than would be possible for more nearly collimated light which is drawn from a narrower source or region.

The beam spread angles may be considered as maximum angles, i.e angles which encompass all of the incident light on the valve in the X or Y directions. However, because the beam spread angles are limiting angles of continuous angular distributions of light it is preferred to define the beam spread angles as the angles which encompass or receive a given percent of the peak intensity of the incident beam. By so doing the necessary or desired light intensity is usable by the system. For purposes of discussion of specific beam spread angles herein the "given percent" of peak intensity referred to above is 50%; however the broader concepts of this invention are applicable regardless of how the beam spread angles are defined.

By way of example, the beam spread angle in the first direction may be up to about 60 degrees. Generally, as the beam spread angle increases beyond 60 degrees the projection lenses must be unacceptably large. If the first beam spread angle is less than about 20 degrees, less light than is desired is provided to the light valve. The actual size of the first beam spread angle in the first direction will be a function of various system parameters including the particular acceptance angle in that direction of the liquid crystal light valve.

The second beam spread angle preferably matches the acceptance angle of the liquid crystal light valve in the same direction, and as such is commonly between 12 and 15 degrees. However, this second beam spread angle may be as small as about 10 degrees or as large as 20 degrees or even larger depending upon the characteristics of the light valve. The ratio of the first beam spread angle to the second beam spread angle is at least about 1.5 to 1 and for many applications at least about 2 to 1.

The first and second beam spread angles are preferably no greater than about the first and second acceptance angles of the liquid crystal light valve, respectively. In a preferred construction, the illumination system provides light to each of the pixels of the liquid crystal light valve at beam spread angles which define a generally elliptical solid angle cone.

The brightest projected image is produced by collecting the maximum amount of energy from the light source and efficiently coupling this energy to the liquid crystal light valve. The available output from the light source is termed Radiance and is given in watts/steradian/$cm^2$, i.e. power per unit solid angle per unit area. Therefore, for maximum brightness it is desirable to collect light over a large solid angle from the source and also to employ a large area source. The product of the solid angle and source area is essentially the quantity called Etendue and this quantity is conserved in passing through the reflector to the light valve. Etendue is discussed for example in *The Optics of Non Imaging Concentrators*, Welford and Winston, Academic Press, 1978. A primary function of the reflector is to compress the beam spread angle in the Y direction of the light bundle collected from the light source and redistribute the light with a wide angular deviation or beam spread in the X direction. The angular reshaping of the light from the light source together with the linear expansion of the beam to fill the light valve aperture makes the most efficient use of the energy of the light source.

Any illumination system that will achieve this goal can be used. A preferred illumination system includes a source of illumination or light source which is elongated in the first direction. The elongated light source efficiently provides more energy in the X direction, the direction which has the larger acceptance angle. However an illumination system may generate beam spread angles in the X and Y direction which are somewhat different from pixel to pixel of the light valve.

The illumination system includes a non-imaging reflector which has a concave reflective surface for reflecting light from the light source toward the light valve substantially at the second beam spread angle and reflective end surfaces for reflecting light from the source toward the light valve substantially at the first beam spread angle. There are a variety of concave surfaces that are capable of compressing the beam spread angle in the Y direction and the concave surface may be of any configuration which will accomplish that function. Thus, the concave surface may include flat sections, concavely curved sections and/or convexly curved sections. In mathematical terms the concave surface may be or include any mathematically discontinuous curve. Examples of prior art concave surfaces for compressing the beam spread angle in the Y direction include a compound parabola, a compound ellipse, and a compound hyperbolic concentrator as set forth, for example, in Goldenberg U.S. Pat. No. 4,912,614. However, the preferred concave surface is substantially elliptical, and as discussed more fully hereinbelow, the concavely curved surface preferably includes a plurality of elliptical sections in the Y direction.

In the process of minimizing the beam spread angle in the Y direction, an offset may be introduced into the deviation angle in the Y direction. With this invention, the illumination system includes a secondary optical element with optical power such as a refractive, diffractive or reflective optical element for reducing, and preferably substantially eliminating, this offset. The preferred optical element is an aspheric corrector lens.

The end surfaces may be of any configuration which will reflect light toward the light valve at the first beam spread angle, Preferably, the end surfaces include diverging reflective surfaces which diverge toward the output aperture. These surfaces strongly influence the beam spread angle in the X direction and the uniformity of light on the light valve. The diverging reflective surfaces may be substantially flat or concavely curved.

To prevent the end surfaces of the reflector from increasing the beam spread angle in the Y direction, each of the end surfaces of the reflector preferably has a reflective back region, and these back regions are substantially flat and substantially parallel. They preferably extend from about the opposite ends of the light source rearwardly or away from the output aperture of the reflector all the way to the vertex of the concavely curved surface.

To help provide a high contrast ratio, this invention preferably provides for transmission of light to the liquid crystal light valve in the Y direction at a bias angle. Consequently, the liquid crystal light valve transmits light at the bias angle in the Y direction. A beam deflector is provided between the liquid crystal light valve and the projection optics for deflecting the light transmitted by the liquid crystal light valve through a deflection angle to at least partially correct for the bias angle. With this invention, the beam deflector includes a diffractive lens to accomplish the beam deflection function and to focus the light into the pupil of the projection optics. This has the advantage of accomplishing beam deflection and focusing without providing surface discontinuities which are likely to be imaged by the projection optics.

The invention, together with additional features and advantages thereof may best be understood by reference to the following description taken in connection with the accompanying illustrative drawings.

BRIEF DESCRIPTION OF THE DRAWINGS

FIG. 1 is block diagram illustrating a projection apparatus constructed in accordance with the teachings of this invention.

FIG. 2 is a schematic perspective view of a preferred reflector and light source.

FIG. 3 is a schematic top plan view of the reflector and light source.

FIG. 3A is a schematic top plan view similar to FIG. 3 showing an alternate construction for the reflector.

FIG. 5 is simplified in that the corrector lens and its effect on the rays are not shown and for simplicity the bias angle is assumed to be zero.

DESCRIPTION OF THE PREFERRED EMBODIMENT

Figure 4:
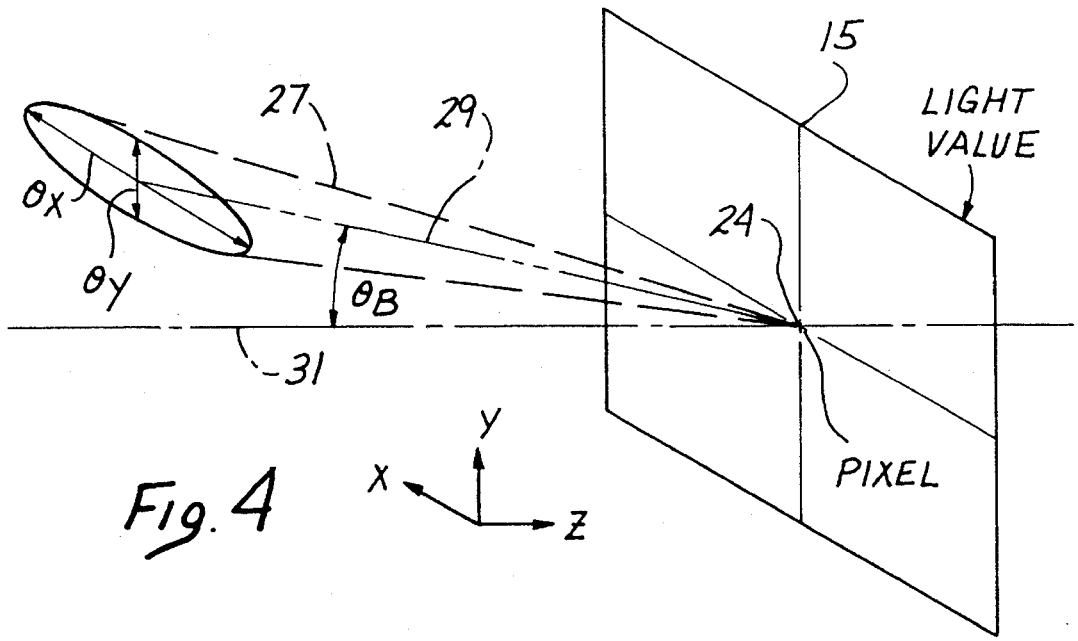
FIG. 4 is a schematic illustration showing the solid angle cone of light being directed toward a pixel of the light valve with the corrector lens removed.

FIG. 1 shows a projection apparatus 11 which generally comprises an illumination system 12 and a liquid crystal light valve 15. The illumination system 12 directs light toward the liquid crystal light valve 15 and includes a focusing and condensing element 13 and an aspherical correcting lens 17 between the element 13 and the light valve. The projection apparatus 11 also includes a beam deflector 19 and projection optics 21 for receiving light from the light valve and projecting such light toward a projection surface, such as a screen 22. The projection apparatus 11 can be used in a variety of systems including multimedia video projectors and is particularly adapted for use as a display for a computer.

The light valve 15, which is commonly referred to as an LCD, exhibits large variations in transmission as a function of the angle incidence of the light at the light valve. The angular dependence of the transmission is such that there is a wide acceptance angle of high contrast in the X direction and a rather narrow acceptance angle in the Y direction i.e. in the Y-Z plane. The X, Y and Z directions for the apparatus 11 are shown in FIGS. 3 and 4. In addition, the acceptance angle in the Y direction has a fixed angular bias $\Theta_B$ (FIG. 1) which is ordinarily of the order of 5 to 20 degrees but which can be zero degrees. If the incident light falls outside of the optimum acceptance angle cone as offset by the bias angle, then light leaks through the liquid crystal light valve 15 in the off state and the contrast ratio is reduced. Accordingly, it is important that the illumination system 12 provide light to the light valve 15 at the optimum incidence angles.

More specifically it is desired that the illumination system 12 provide light to each of a plurality of pixels, such as the central pixel 24 (FIG. 4), of a region of the liquid crystal light valve 15 at a first beam spread or deviation angle $\Theta_X$ in the X direction and a second beam spread or deviation angle $\Theta_Y$ in the Y direction with the first beam spread angle being larger than the second beam spread angle at each of the plurality of pixels of such region. Preferably, such region includes the entire active surface of the light valve 15. This defines a solid angle cone 27 having a generally elliptical cross section. This solid angle cone 27 represents what would be seen looking backward from the pixel 24 shown in FIG. 4 toward the focusing and condensing element 13. A similar solid angle cone could be seen from each pixel of the light valve 15. Thus, the light valve 15 is provided with light which has a larger beam spread angle in the X direction than in the Y direction. In addition, the solid angle cone has a central or optical axis 29 (FIGS. 1 and 4) which is offset from a reference line 31 normal to the light valve 15 by the bias angle $\Theta_B$. The reference line 31 is also the Z axis for the apparatus 11 and the optical axis of the projection optics 21.

The illumination system 12 of FIGS. 2, 3 and 3A is designed to provide incident light to the light valve 15 as shown in FIG. 4. In this regard, focusing and condensing element 13 comprises a non-imaging, reflector 23 and a light source 25 (FIG. 2). Reflector-light source combinations are commonly referred to as focusing and condensing elements even though the reflector is a nonimaging reflector. Although the light source 25 may of various different kinds, it is preferably elongated in the X direction to provide substantial energy over a large beam spread angle in the X direction. For example, a light source which includes a long tungsten filament may be utilized. Also, the light source 25 preferably has a small dimension d (FIG. 5) in the Y-Z plane to minimize the beam spread angle $\Theta_Y$.

The reflector 23 has a concavely curved mirror or reflective surface 33 for reflecting light from the source toward the light valve 15 at the beam spread angle $\Theta_Y$. The reflective concave surface 33, which is described in greater detail hereinbelow, is preferably substantially elliptical and more preferably includes a plurality of elliptical sections.

As shown in FIG. 2, the reflector 23 may be considered as disposed in a spatial coordinate system having X, Y and Z axes with the reflector having a rectangular output aperture 35 disposed about the optical axis 29 which is also the Z axis for the reflector 23. The X direction and X axis are the same for the reflector 23 as for the apparatus 11. However, for a bias angle $\Theta_B$ which is greater than zero, the optical axis 29 which is also the Z axis for the reflector 23, is rotated from the Z axis 31 for the apparatus 11 by the bias angle $\Theta_B$, and in this event the Y axis and Y direction for the reflector 23 is also rotated by the bias angle $\Theta_B$ from the Y axis and Y direction for the apparatus 11. Because the bias angle $\Theta_B$ is small and may even be zero, the Y direction for the reflector 23 and the apparatus 11 may be considered as substantially the same. Also notwithstanding the rotation referred to above, the Y direction for both the reflector 23 and the apparatus 11 lie in the Y-Z plane.

The reflector 23 is oriented so that the reflective concave surface 33 is symmetrical about the optical axis 29 in the Y-Z plane. The reflective concave surface may be considered as being substantially in the Y-Z Z plane. The reflective surface 33 has a back surface 37 opposite the output aperture 35 which includes the vertex 38 of the reflective surface 33. The vertex 38, which in actual practice of the invention may be cut away if desired, extends in the X direction and is on the optical axis 29. The reflective surface 33 may be considered as a Y-Z reflective surface because it provides the deviation or beam spread angle $\Theta_Y$ in the Y direction or in the Y-Z plane.

The reflector 23 has mirror or reflective end surfaces 39 (FIGS. 2 and 3) at opposite ends of the reflective concave surface 33. Each of the end surfaces 39 has a back region 41 which extends from the back surface 37 of the reflective concave surface 33 toward the light source 25 and the output aperture 35. The back regions 41 are substantially flat, substantially parallel and are substantially in the Y-Z plane.

Preferably the light source 25 is on the optical axis 29 and extends in the X direction for substantially the full distance between the back regions 41. In addition, the back regions 41 preferably terminate at the forward-most point of the light source 25. In the case of a filamentary light source, the light source is the filament and not the surrounding bulb. The reason for this positioning of the light source and for making the back regions 41 substantially flat and substantially parallel is to maintain the apparent size and location of the source 25 as seen from the reflective concave surface 33 so as to maintain a minimum beam spread angle $\Theta_Y$. If the back regions 41 were skewed and not parallel, the image of the light source 25 in the back regions 41 would not be in alignment with the light source 25. Consequently, it would appear as if the light source 25 were bent at the back regions 41 and the location of this image would no longer be at the same location in the direction of the optical axis 29 as the actual light source 25 and would be out of focus for the concave reflective surface 33. This would potentially reduce the efficiency of the focusing and condensing element 13 and would increase the beam spread angle $\Theta_Y$. A similar result would be obtained if the back regions 41 were curved. Of course, modest departures from the desired substantially flat, parallel relationship can be tolerated. However, significant skewing of the back regions will degrade performance of the reflector 23. Furthermore, the longer the light source 25, the more parallel the back regions should be to obtain optimum performance. In this regard, it is the radiating element of the source, e.g. the filament that is important.

Each of the end surfaces 39 includes a diverging mirror or reflective surface 43 which extends from the associated back region 41 to the output aperture 35 for reflecting light from the light source 25 toward the light valve 15 substantially at the beam spread angle $\Theta_X$. The reflective surfaces 43 are joined to the associated back region at the light source 25 and preferably at the forwardmost point of the light source. As best shown in FIG. 3, the diverging reflective surfaces 43 diverge outwardly at the same divergence angle D (FIG. 3) as they extend toward the output aperture 35. The diverging reflective surfaces 43 may be substantially flat and substantially planar as shown in FIG. 3.

FIG. 3 also shows schematically and by way of example how the diverging reflective surfaces 43 reflect light from the light source 25 toward the light valve 15 substantially at the beam spread angle $\Theta_X$. FIG. 3 shows the beam spread angle $\Theta_X$ at the central pixel 24.

FIG. 3A shows a focusing and condensing element 13a which is identical to the element 13 in all respects except that the diverging reflective surfaces 43a are concavely curved with the concavities of the curves facing each other. Portions of the element 13a corresponding to portions of the element 13 are designated by corresponding reference numerals followed by the letter "a". The surfaces 43a may be identically curved. The surfaces 43a may be cylindrical, having optical power in the X axis or include generally elliptical sections generated as described below for the surface 33.

Figure 5:
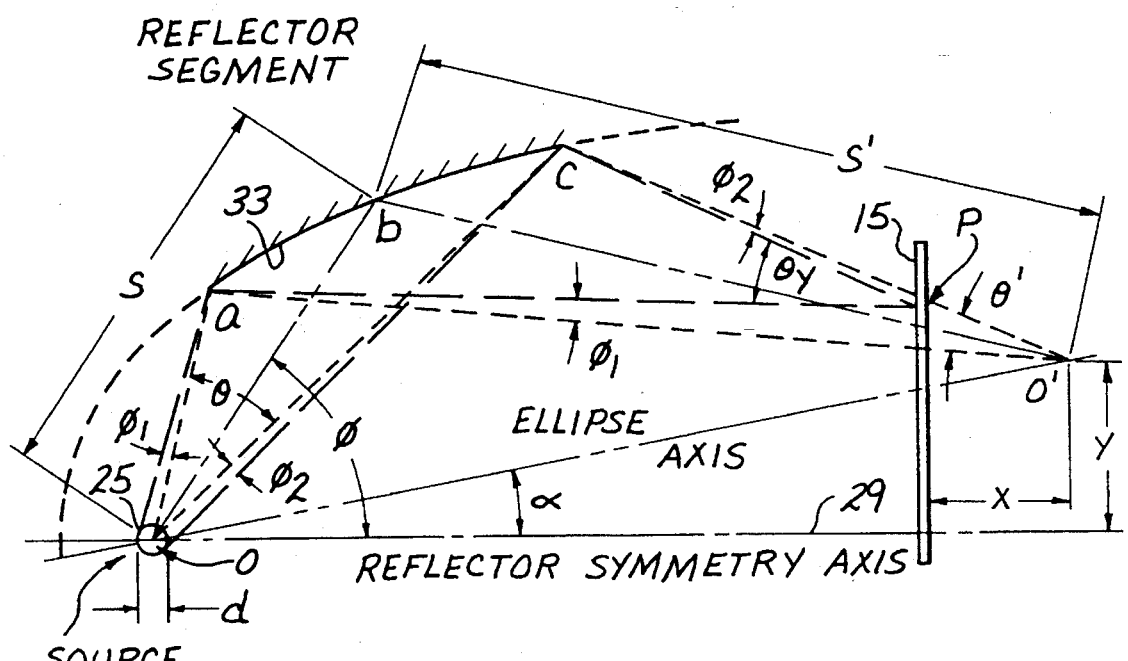
FIG. 5 is a ray tracing showing how light is reflected from the source to provide the beam spread angle in the Y direction.

One preferred construction for the reflective concave surface 33 is shown in FIG. 5 where that surface is shown in the X-Z plane. FIG. 5 also shows how the reflective concave surface 33 generates a small beam spread angle $\Theta_Y$ and shows the offset introduced into this angle. The offset is corrected by the corrector lens 17 as discussed below in connection with FIGS. 6 and 7. In FIG. 5, the bias angle $\Theta_B$ is zero and so the axes 29 and 31 (FIG. 1) coincide.

The reflective concave surface 33 includes a number of elliptical mirror segments such as the elliptical segment defined by points a, b and c which are shown as spaced along the reflective concave surface 33. The elliptical segment defined by the points a, b and c is very small and may be, for example, 2 mm in length from the point a to the point c. The length of the segment a, b and c is greatly enlarged in FIG. 5. In the example illustrated, the point b is at the center of the elliptical segment and the elliptical segment extends in the X direction for the full length of the reflective concave surface 33. The reflective concave surface 33 is substantially elliptical and the ellipse segment a, b and c has an ellipse axis O–O' which is tilted at an angle α in the Y-Z plane with respect to the optical axis 29 which is also the reflector symmetry axis, i.e. the axis about which the reflective concave surface 33 is symmetrical in the Y-Z plane. The axis O–O' is defined by the point O, which is at the center of the light source 25 and the point O' which is the focal point of the rays emanating from the center O of the light source and reflected from the points a and c at the end of the elliptical segment a, b and c. The point O is at the intersection of the axes 29 and O–O'. The elliptical segment a, b and c is designed to compass some range of polar angles $\phi \pm \Theta/2$ where $\phi$ is the angle between the optical axis 29 and the ray from the center of the light source 25 to the point b. The distances S, S' and O–O', which describe the shape of the ellipse and the distances X and Y, which describe the tilt of the axis O–O' of the ellipse segment a, b and c, are all adjusted by means of computer iteration to produce uniform illumination of the light valve 15. As shown in FIG. 5, the distance S is from the center of the light source 25 to the point b, the distance S' is from the point b to the point O' and the distance O–O' is from the point O to the point O'. The following equations govern this iterative design process:

$$\Theta' = \frac{\Theta}{(S'/S)}$$

where

S'/S is called the magnification ratio and S'+S=constant, for an ellipse $\Theta_Y = \Theta' + (\phi_1 + \phi_2)$ where $(\phi_1 + \phi_2) = d/s$ and $\phi_1$ is the angle formed by rays from the center and left or rear periphery of the light source 25 at the point a, $\phi_2$ is the angle formed by the rays from the center and right or forward periphery of the light source 25 at the point c and d is the diameter of the light source, i.e. the filament in the case of a filamentary light source, $$\Theta_Y = \frac{\Theta}{(S'/S)} + d/S$$

The last part of this equation shows the dependence of $\Theta_Y$ on the diameter d of the light source. The intensity of the illumination at the pixel P is directly proportional to the ratio $\Theta_Y/\Theta$ which is closely related to the magnification ratio S'/S in the first part of the same equation. The choice of the parameters of the tilted elliptical mirror segment in the computer iterative process allows the balancing of the quantities in the above equation to achieve the desired minimum value of $\Theta_Y$ together with the desired uniformity of illumination across the Y dimension of the light valve.

Liquid crystal light valves, such as the light valve 15, have different characteristics, and it may be desirable to tailor the beam spread angles $\Theta_X$ and $\Theta_Y$ to thereby tailor the incident light for the particular requirements of a particular light valve 15. The equation set forth above for $\Theta_Y$ shows generally how the magnitude of $\Theta_Y$ can be varied. The magnitude of $\Theta_X$ is a function of the length of the light source 25 and the divergence angle D (FIG. 3). As shown in FIG. 3, the divergence angle D is the angle formed by each of the diverging reflective surfaces 43 and an extension of the associated back region 41. Generally, the magnitude of $\Theta_X$ can be increased by increasing the length of the light source 25 and/or by increasing the angle of divergence D.

By way of example, the light valve 15 may be rectangular, have a diagonal dimension of 4.7 inches and an aspect ratio of 4 to 3 where 4 represents the width. The output aperture 35 may have a shape and size matching that of the light valve 15. The length of the back surface 37 in the X direction as well as the length of the light source 25 may be about ⅛ of the diagonal of the valve 15, or in this example about 0.588 inch. The light source 25 may have a ¼ inch diameter filament and the spacing from the center of the filament to the back surface 37 along the optical axis 29 may be, for example, about 0.50 inch. The distance from the front surface of the light valve 15 to the center of the light source 25 may be, for example, about 1 diagonal of the light valve or in this example about 4.7 inches. The light valve is placed close to the output aperture 35 and so the divergence angle D may be about 20°.

Figure 6:
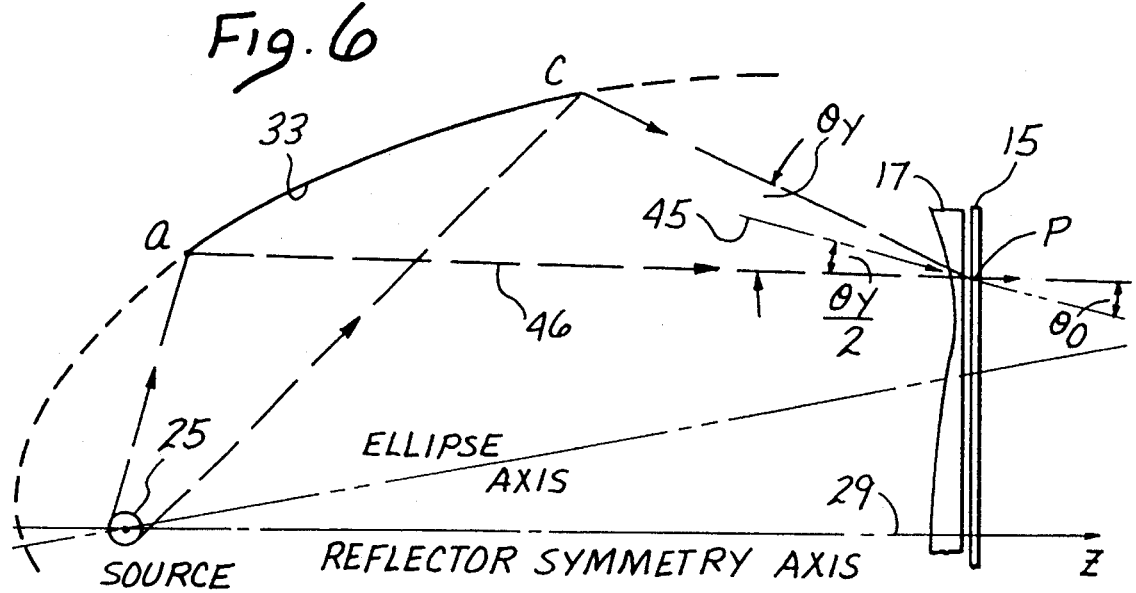
FIG. 6 is a view similar to view 5 illustrating how the aspheric corrector lens compensates for the offset in the beam spread angle in the Y direction. For simplicity the bias angle is assumed to be zero.

In the process of minimizing $\Theta_Y$ and achieving uniform illumination, the bisector 45 (FIG. 6) of the angle $\Theta_Y$ may develop an offset angle $\Theta_O$, with respect to a reference line 46 normal to the surface of the light valve 15 (FIG. 6). In the example shown in FIG. 6, the line from the point a to the pixel P, which defines one edge of the beam spread angle $\Theta_Y$, is also the reference line 46 which is normal to the surface of the light valve 15. The offset angle $\Theta_O$ is the result of constructing and arranging of the light source 25 and the reflective concave surface 33 to achieve uniform illumination of the light valve 15 and an angle $\Theta_Y$ of a minimum value. This offset angle, $\Theta_O$, may result in degraded image contrast for the same reasons as for minimizing $\Theta_Y$ that were discussed above, i.e. the offset angle if not removed would direct the illumination in the Y direction at the light valve 15 at a non-optimal angle. In FIG. 6, it is assumed that the bias angle $\Theta_B$ is 0, i.e. it is assumed that the optimal direction or path for the bisector 45 is normal or perpendicular to the surface of the light valve 15.

For these reasons, it is desirable to remove the offset angle so that image contrast can be maximized. The offset angle $\Theta_O$ can be removed by introducing the corrector lens 17 as shown in FIG. 6. The corrector lens 17 is aspheric and has the proper surface slope needed to tilt the bisector 45 of $\Theta_Y$ so as to become normal to the surface of the light valve 15. Introduction of the corrector lens 17 also allows the projection optics 21 to employ a projection lens of higher f number, with consequent reduction of the projection lens diameter. This also simplifies the projection lens and reduces its cost.

Figure 7A:
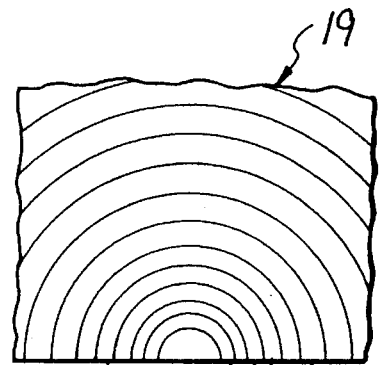
FIG. 7A is a fragmentary elevational view of the corrector lens.
Figure 7:
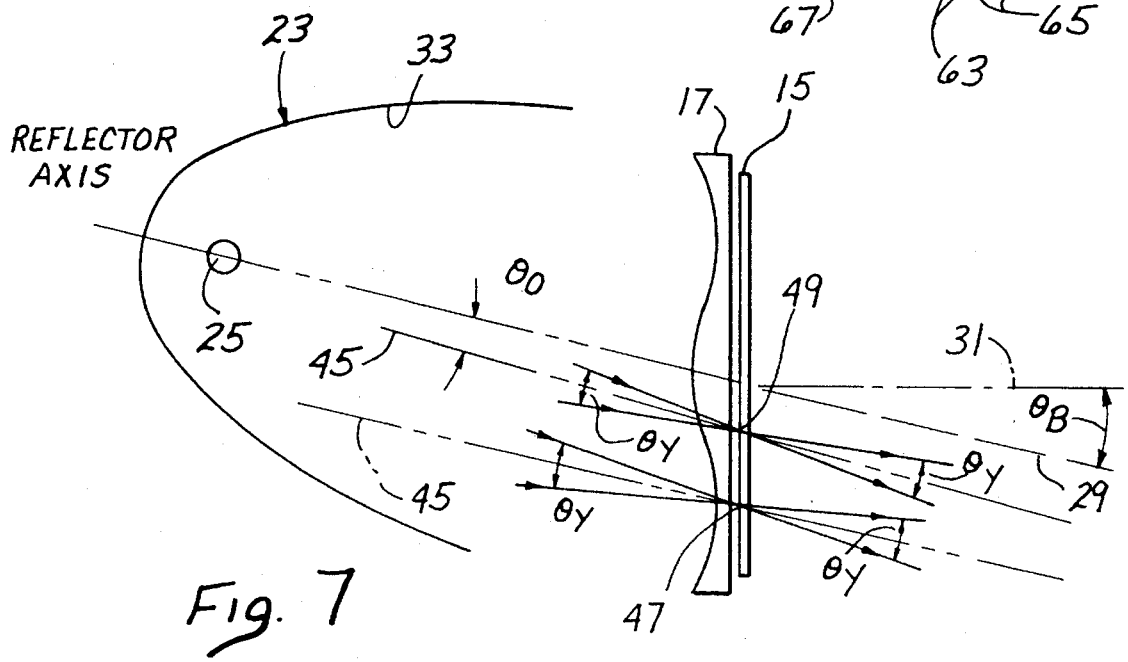
FIG. 7 is a schematic view illustrating how the corrector lens eliminates the offset angle when the light valve has a bias angle greater than zero.

FIG. 7 illustrates how the corrector lens 17 eliminates the offset angle $\Theta_0$ when the light valve 15 has a bias angle $\Theta_B$ which is greater than 0. As shown in FIG. 7, the bias angle $\Theta_B$ is the angle between the reference line 31 (FIGS. 1 and 7) and the optical axis 29 of the reflector 23 and light source 25. The reference line 31 is also the optical axis of the projection optics 21 (FIG. 1).

Each pixel of the light valve 15 receives incident light having a beam spread angle $\Theta_Y$ and two of such pixels 47 and 49 are shown by way of example in FIG. 7. The reflector 23 and the light source 25 provide incident light to the pixel 47 at a beam spread angle $\Theta_Y$ in the Y-Z plane having a bisector 45 which is parallel to the optical axis 29. Consequently, the light from the reflector 33 which is incident on the pixel 47 passes through the corrector lens 17 essentially without refraction and also passes through the light valve 15 along a path parallel to the optical axis 29 at the bias angle $\Theta_B$ to provide high contrast.

The light incident on the pixel 49 of the light valve 15 also has a beam spread angle $\Theta_Y$ which ordinarily will be equal to the beam spread angle $\Theta_Y$ incident upon the pixel 49 and other pixels of the light valve. However, the beam spread angle $\Theta_Y$ incident upon the pixel 49 has a bisector 45 which is not parallel to the optical axis 29 to thereby define the offset angle $\Theta_O$. However, the corrector lens 17 redirects or refracts this light such that the bisector 45 is made parallel to the optical axis 29 so it can pass through the light valve 15 along a path parallel to the optical axis 29 at the bias angle $\Theta_B$ to thereby provide high contrast.

Thus, FIG. 7 illustrates how the corrector lens 17 redirects light incident upon the light valve 15 such that the bisectors 45 of the angle $\Theta_Y$ are all substantially parallel to the optical axis 29 to thereby achieve high contrast. Because the bisectors of the angles $\Theta_Y$ representing light incident upon the light valve 15 may define offset angles $\Theta_O$ of different magnitudes, the corrector lens should be aspheric.

Figure 8:
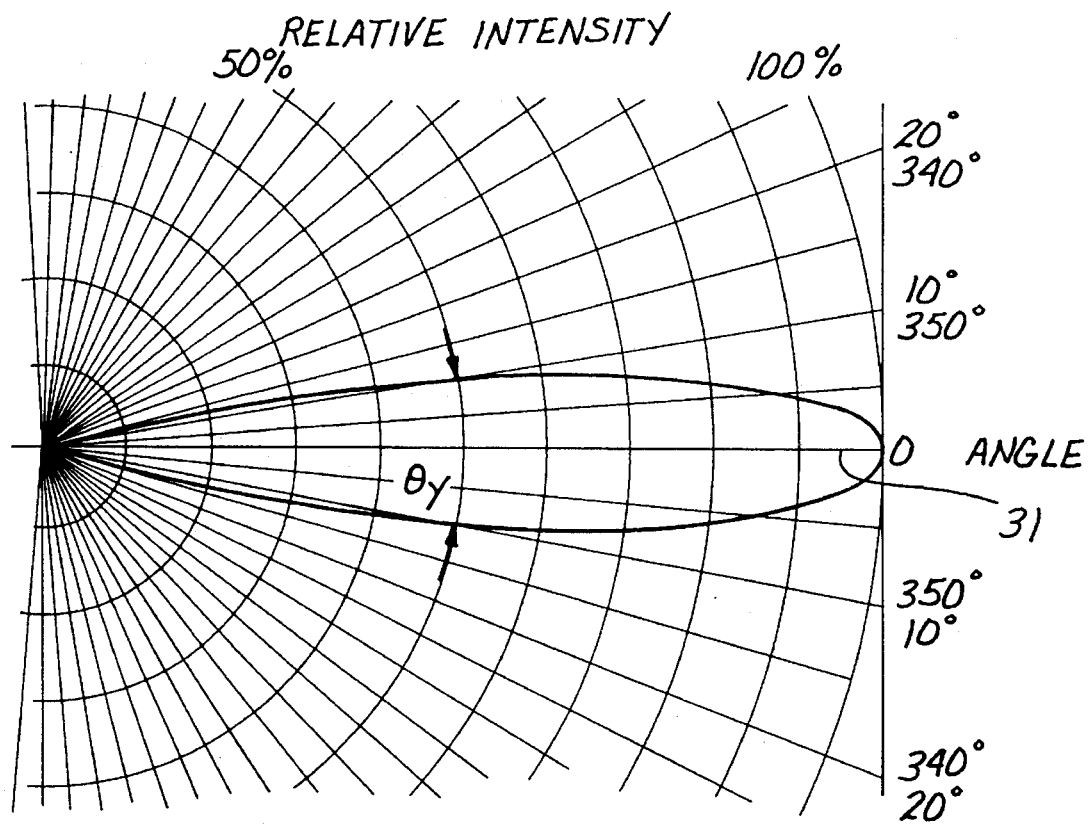
FIG. 8 is a polar plot of relative intensity of the illumination versus angle within the beam.

The beam spread angles $\Theta_X$ and $\Theta_Y$ are the limiting angles of continuous angular distributions of light. Such light distributions are typically described by polar plots such as the isoplot shown in FIG. 8. FIG. 8 shows the relative intensity of the illumination versus angle within the beam using polar coordinates. The relative intensity is measured as a percent of the maximum intensity. A limiting angle, such as $\Theta_Y$, is the beam spread angle at which intensity of the incident beam is 50% of the peak intensity of the incident beam. Although other percentages can be chosen, 50% is preferred and is used herein for defining of the beam spread angles $\Theta_X$ and $\Theta_Y$. The light falling outside of the beam spread angle $\Theta_Y$ does not significantly degrade contrast in the projected image.

The isoplot of FIG. 8 can be generated for the apparatus 11 of FIG. 1 by measuring the intensity of the illumination in the X-Y plane at the projection optics 21 as a function of the angle at which such intensity is measured. Thus, if the origin of the isoplot of FIG. 8 is considered as a small pinhole at the optical axis 31 of the light valve 15, then the maximum intensity, i.e. 100% relative intensity is detected along the axis 31. As the light detector is moved in the Y-Z plane through an angle away from the axis 31, the intensity of the illumination decreases and points can be plotted corresponding to such angles thereby generating the plot shown in FIG. 8. In FIG. 8, $\Theta_Y$ is shown by way of example as being 20°, i.e. zero ±10° because that is the angle at the 50% relative intensity line. $\Theta_X$ is measured in the identical manner described above for $\Theta_Y$ except that the detector is moved in the X-Y plane through an angle away from the axis 31 to generate the plot for $\Theta_X$.

Figure 9:
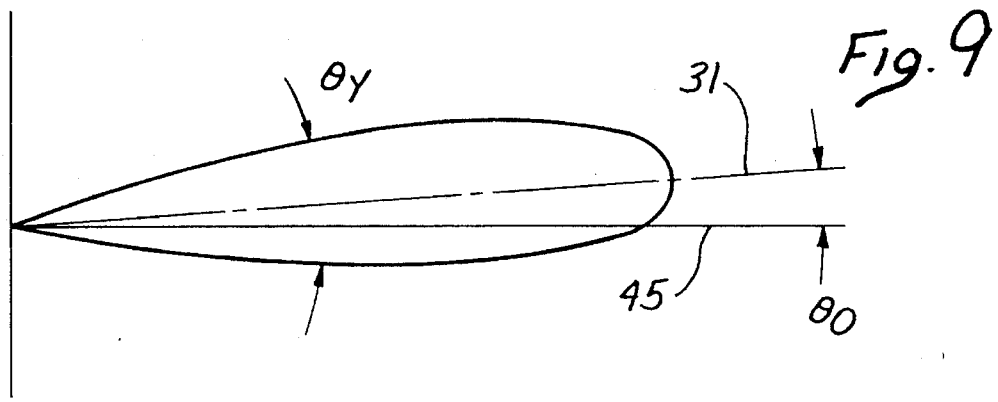
FIG. 9 is a plot similar to FIG. 8 illustrating the offset of the beam Spread angle in the Y direction.

FIG. 9 is a plot identical to FIG. 8 with the bisector 45 of the beam spread angle $\Theta_Y$ incident upon the light valve 15 at the axis 31 being illustrated as though the corrector lens 17 were not being utilized. This shows that the offset angle $\Theta_O$ is measured to the center of the beam spread angle $\Theta_Y$ light distribution curve.

Light passing through the light valve 15 at the bias angle $\Theta_B$ (FIG. 11) could be allowed to continue in that direction in which event the projection optics 21 would require a larger field of view. Preferably, however, the beam deflector 19, which is between the light valve 15 and the projection optics 21, is employed. The beam deflector 19 bends the central axis of the beam passing through the light valve 15 through an angle equal to the bias angle $\Theta_B$. In addition, the beam deflecting element 19 focuses the beam from the light valve 15 into the entrance pupil of the projection optics 21 and thus significantly reduces the size, weight and cost of the projection optics 21.

Figure 10:
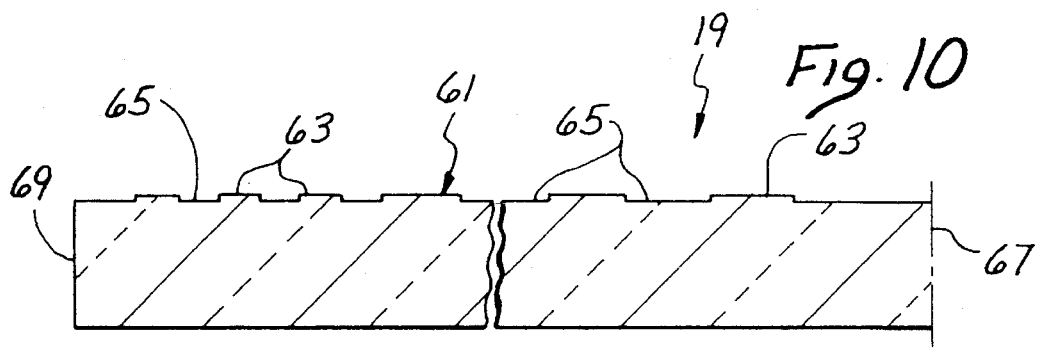
FIG. 10 is a sectional view illustrating one form of diffractive lens that can be used for correcting the bias angle.

The beam deflector 19 may be a Fresnel lens as shown, for example, Tejima et al U.S. Pat. No. 4,936,657. Preferably, however, the beam deflector 19 is a diffractive lens, such as the diffractive lens 61 (FIGS. 7A and 10). The diffractive lens 61 may be a holographic optical element or a binary optical element. Although the diffractive lens 61 may have various different profiles, in the form shown in FIG. 10, it is rectangular and of about the same size and shape as the light valve 15. The lens 61 includes concentric, semi-annular ridges 63 spaced apart by concentric, semi-annular grooves 65. The lens 19 has a center line or central axis 67 and an outer periphery 69 and the ridges 63 and the grooves 65 are of progressively smaller radial dimension in a radial outward direction such that the innermost ridge 63 has a larger radial dimension than the outermost ridge 63. FIG. 10 greatly exaggerates the dimensions of the ridges 63 and the grooves 65. In fact, the sizes of each of the ridges 63 and the grooves 65 is significantly smaller than the pixel dimension of the light valve 15 to suppress the visibility of these lens "features" in the projected image. For example, the feature size, i.e. the radial dimensions of the ridges 63 and the grooves 65 in a holographic optical element approaches the wavelength of the light incident upon the light valve 15. The diffractive lens 61 also efficiently focuses the light into the projection optics 21. The diffractive lens 61 is interposed between the light valve 15 and the projection optics 21 with its axis 65 parallel to the axis 31 as shown in FIG. 1.

The projection optics 21 may include any suitable arrangement of optical elements which will project the image onto the screen 22 (FIG. 11). Suitable projection optics are known and therefore are not further described herein.

In use of the projection apparatus 11, light from the light source 25 is directed by the reflector 23 at the appropriate beam spread angles $\Theta_X$ and $\Theta_Y$ toward the light valve 15 with the corrector lens 17 appropriately redirecting the light through the light valve 15 at the bias angle $\Theta_B$ (FIG. 7). The beam deflector 19 redirects the light transmitted by the light valve 15 through a deflection angle toward the projection optics 21. The light valve 15 modulates the light transmitted by it in accordance with conventional practice to provide an image which the projection optics 21 projects toward a projection surface such as the screen 22.

Although exemplary embodiments of the invention have been shown and described, many changes, modifications and substitutions may be made by one having ordinary skill in the art without necessarily departing from the spirit and scope of this invention.

We claim:

1. A projection apparatus comprising:

a liquid crystal light valve having a first acceptance angle in a first direction and a second acceptance angle in a second direction transverse to the first direction, said first acceptance angle being larger than said second acceptance angle;

an illumination system for providing light to each of a plurality of pixels of a region of the liquid crystal light valve at a first beam spread angle in said first direction and a second beam spread angle in the second direction with the first beam spread angle being larger than the second beam spread angle at each of said plurality of pixels of said region, said illumination system including a light source which is elongated generally in the first direction;

said liquid crystal light valve being capable of modulating the light provided to it by the illumination system; and projection optics for receiving light from the liquid crystal light valve and projecting such light toward a projection surface.

2. An apparatus as defined in claim 1 wherein the first beam spread angle at each of said plurality of pixels of said region is at least about 20°.

3. An apparatus as defined in claim 1 wherein the first beam spread angle at each of said plurality of pixels of said region is at least about 60°.

4. An apparatus as defined in claim 1 wherein the ratio of the first beam spread angle to the second beam spread angle is at least about 2 to 1.

5. An apparatus as defined in claim 1 wherein the ratio of the first beam spread angle to the second beam spread angle is at least about 1.5 to 1.

6. An apparatus as defined in claim 1 wherein the first beam spread angle is at least about 20° and the ratio of the first beam spread angle to the second beam spread angle is at least about 2 to 1.

7. An apparatus as defined in claim 6 wherein the first and second beam spread angles are no greater than about the first and second acceptance angles, respectively.

8. An apparatus as defined in claim 1 wherein the illumination system provides light to each of said plurality of pixels at beam spread angles which define a generally elliptical solid angle cone.

9. An apparatus as defined in claim 1 wherein said region covers substantially the entire active area of said light valve.

10. An apparatus as defined in claim 1 wherein the illumination system includes a nonimaging reflector having a concave reflective surface for reflecting light from the source toward the light valve substantially at said second beam spread angle and end surfaces for reflecting light from the source toward the light valve substantially at the first beam spread angle.

11. An apparatus as defined in claim 10 wherein the concave reflective surface introduces an offset angle in the second beam spread angle and the illumination system includes a an optical element for reducing said offset.

12. An apparatus as defined in claim 10 wherein said end surfaces include diverging reflective surfaces which diverge as they extend away from the light source.

13. An apparatus as defined in claim 1 wherein the liquid crystal light valve transmits light at a bias angle of greater than zero degrees and the system includes a beam deflector between the liquid crystal light valve and the projection optics for deflecting the light transmitted by the liquid crystal light valve through a deflection angle toward the projection optics to at least partly correct for the bias angle, and said beam deflector includes a diffractive lens.

14. A projection system comprising:
   a liquid crystal light valve having a wider acceptance angle for incident light in a first direction than in a plane transverse to the first direction;
   an illumination system for providing light to the liquid crystal light valve which has a larger beam spread angle in the first direction than in said plane, at least some of the light from said illumination system passing through the liquid crystal light valve, the ratio of the beam spread angle in the first direction to the beam spread angle in said plane being at least about 2 to 1; and
   projection optics for receiving light from liquid crystal light valve and projecting such light toward a projection surface.

15. A system as defined in claim 14 wherein the illumination system incudes a nonimaging reflector and a light source in the reflector, said reflector having a concave surface for reflecting light from the light source toward the light valve at a beam spread angle in said plane and end surfaces for reflecting light from the light source toward the light valve at a beam spread angle in the first direction.

16. A system as defined in claim 14 wherein the light valve transmits light at a bias angle in said plane and the light provided to the light valve in said plane is provided at the bias angle whereby the liquid crystal light valve transmits light at the bias angle in said plane and the system includes a beam deflector between the liquid crystal light valve and the projection optics for deflecting the light transmitted by the liquid crystal light valve through a deflection angle toward the projection optics to at least partly correct for the bias angle, said beam deflector including a diffractive lens.

17. A system as defined in claim 16 wherein the deflection angle and the bias angle are of about the same magnitude.

18. A system as defined in claim 14 wherein the illumination system includes a nonimaging reflector which introduces an offset angle in the second beam spread angle and the illumination system includes an optical element for reducing said offset.

19. A projection system comprising:
   a liquid crystal light valve having a first acceptance angle in a first direction and a second acceptance angle in a second direction transverse to the first direction, said first acceptance angle being larger than said second acceptance angle, said light valve transmitting light along a path which forms a bias angle with a reference line normal to the light valve, said bias angle being between 0 degrees and some value other than 0;
   an illumination system for directing the light toward the liquid crystal light valve, said illumination system having an optical axis and including a nonimaging reflector having an output aperture disposed about the optical axis and an elongated light source extending generally in the first direction within the reflector for illuminating the output aperture, said optical axis at the light valve extending generally along said path;
   said illumination system providing light forming a first beam spread angle about said optical axis in said first direction and forming a second beam spread angle about said optical axis in said second direction, said first beam spread angle being larger than the second beam spread angle; and
   projection optics for receiving light from liquid crystal light valve and projecting such light toward a projection surface.

20. A system as defined in claim 19 wherein said reflector has a substantially elliptical reflective surface for reflecting light from the source toward the light valve substantially at the second beam spread angle.

21. A system as defined in claim 20 wherein said reflector includes a plurality of elliptical sections for reflecting light from the source toward the light valve, at least one of the elliptical sections has an ellipse axis which is inclined with respect to the optical axis.

22. A system as defined in claim 21 wherein the optical axis and the ellipse axis intersect and the light source extends through the intersection of said axes.

23. A system as defined in claim 19 wherein the reflector includes a concave reflective surface for reflecting light from the source toward the light valve and end surfaces at the opposite ends of the concave reflective surface, the concave reflective surface has a back surface generally opposite the output aperture, and each of the end surfaces has a back region which extends from the back surface of the curved reflective surface toward the light source and said back regions are substantially flat and substantially parallel.

24. A system as defined in claim 23 wherein said back regions of the end surface terminate at the light source.

25. A system as defined in claim 23 wherein each of said end surfaces includes a diverging reflective surface extending from the associated back region toward the output aperture for reflecting light from the source toward the light valve substantially at said first beam spread angle, said diverging reflective surfaces diverging toward the output aperture.

26. A system as defined in claim 25 wherein the diverging reflective surfaces are substantially flat.

27. A system as defined in claim 25 wherein the diverging reflective surfaces are concave.

28. A system as defined in claim 23 wherein the illumination system includes a lens for redirecting light from the concave reflective surface toward the light valve.

29. A system as defined in claim 19 wherein the reflector includes a curved concave reflective surface for reflecting light from the source toward the light valve and end surfaces at opposite ends of the curved reflective surface for reflecting light from the source toward the light valve substantially at said first beam spread angle, said end surfaces include diverging reflective surfaces which diverge toward the output aperture.

30. An apparatus comprising:
   a light source;

a nonimaging reflector for reflecting light from the light source at a first beam spread angle in a first direction and a second beam spread angle in a second direction transverse to the first direction, said first beam spread angle larger than the second beam spread angle, said second beam spread angle have a bisector;

a liquid crystal light valve having a first acceptance angle in the first direction and a second acceptance angle in the second direction, said first acceptance angle being larger than the second acceptance angle, said light value transmitting incident light along a path in the second direction; and an aspheric optical element with power for directing the bisector of the second beam spread angle to the light value along said path at each of a plurality of pixels.

31. An apparatus as defined in claim 30 wherein the path forms a bias angle in the second direction with a reference line normal to the light valve, said bias angle being greater than zero.

32. An apparatus comprising:

a liquid crystal light valve having a first acceptance angle in a first direction and a second acceptance angle in a second direction transverse to the first direction, said first acceptance angle being larger than said second acceptance angle;

an illumination system including a nonimaging reflector and a light source for providing light to each of a plurality of pixels of a region of the liquid crystal light valve at a first beam spread angle in said first direction and a second beam spread angle in the second direction with the first beam spread angle being larger than the second beam spread angle at each of said plurality of pixels of said region, the ratio of the first beam spread angle to the second beam spread angle being at least about 2 to 1;

said liquid crystal light valve being capable of modulating the light provided to it by the illumination system; and said beam spread angles at each of said pixels being the angle at which intensity of light within a beam of light from the illumination system incident on the associated pixel is 50% of the peak intensity of such incident light at such pixel.

33. An illumination system comprising:

a nonimaging reflector disposed in a spatial coordinate system having X, Y and Z axes, said reflector having an output aperture disposed about the Z axis;

said reflector having a substantially elliptical reflective surface with opposite ends and end surfaces at said opposite ends;

an elongated light source in said reflector between said end surfaces, said light source being substantially on the Z axis, said light source being elongated in the direction of the X axis and extending generally in the direction of the X axis;

the elliptical reflective surface being substantially in a Y-Z plane and having a back surface generally opposite the output aperture;

each of said end surfaces having a back region which extends from the back surface of the elliptical reflective surface toward the light source, said back regions being substantially flat and substantially parallel and being substantially in Y-Z planes; and each of said end surfaces including a diverging reflective surface extending from the associated back region toward the output aperture, said diverging reflective surfaces diverging as viewed in an X-Y plane as such reflective surfaces extend toward the output aperture.

34. A system as defined in claim 33 wherein each of the diverging reflective surfaces is joined to the associated back region substantially at the light source.

* * * * *